(12) United States Patent
Kurahashi et al.

(10) Patent No.: US 8,358,259 B2
(45) Date of Patent: Jan. 22, 2013

(54) LIQUID CRYSTAL DISPLAY DEVICE

(75) Inventors: Nagatoshi Kurahashi, Ooamishirasato (JP); Masahiro Ishii, Mobara (JP); Hiroshi Yamagata, Chiba (JP)

(73) Assignees: Hitachi Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 1305 days.

(21) Appl. No.: 11/822,252

(22) Filed: Jul. 3, 2007

(65) Prior Publication Data

US 2008/0012808 A1 Jan. 17, 2008

(30) Foreign Application Priority Data

Jul. 13, 2006 (JP) .................................. 2006-192274

(51) Int. Cl.
*G09G 3/36* (2006.01)
(52) U.S. Cl. ......................................................... 345/87
(58) Field of Classification Search ........................ None
See application file for complete search history.

(56) References Cited

U.S. PATENT DOCUMENTS

| 7,483,110 | B2 | 1/2009 | Yamaguchi et al. | |
| 2005/0184980 | A1* | 8/2005 | Sato et al. | 345/204 |
| 2005/0225708 | A1 | 10/2005 | Oke et al. | |

FOREIGN PATENT DOCUMENTS

| JP | 63-200127 | 8/1988 |
| JP | 11-052427 | 8/1997 |
| JP | 10-170935 | 6/1998 |
| JP | 2000-227609 | 8/2000 |
| JP | 2005-241778 | 2/2004 |
| JP | 2005-003802 | 1/2005 |
| JP | 2005-275144 | 10/2005 |
| JP | 2005-300821 | 10/2005 |

* cited by examiner

*Primary Examiner* — Tammy Pham
(74) *Attorney, Agent, or Firm* — Stites & Harbison, PLLC; Juan Carlos A. Marquez, Esq.; Stephen J. Wever

(57) ABSTRACT

The present invention provides a liquid crystal display device which can obviate the generation of leaking of light and display irregularities in the vicinities of so-called dummy pixels. The liquid crystal display device includes a pair of substrates which are arranged to face each other in an opposed manner with liquid crystal sandwiched therebetween, a plurality of gate signal lines and a plurality of drain signal lines which are formed on one substrate in a matrix array, a plurality of pixel regions defined by the gate signal lines and the drain signal lines, and a reference electrode and a pixel electrode which are formed in the inside of each pixel region. In such a constitution, the plurality of pixel regions are formed in both a display region and a non-display region, and a voltage applied to the reference electrodes is applied to the pixel electrodes in the inside of the pixel regions in the non-display region.

7 Claims, 5 Drawing Sheets

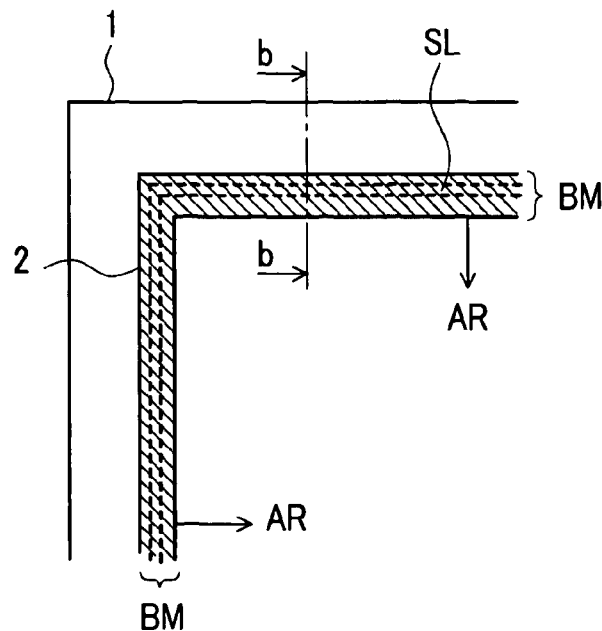
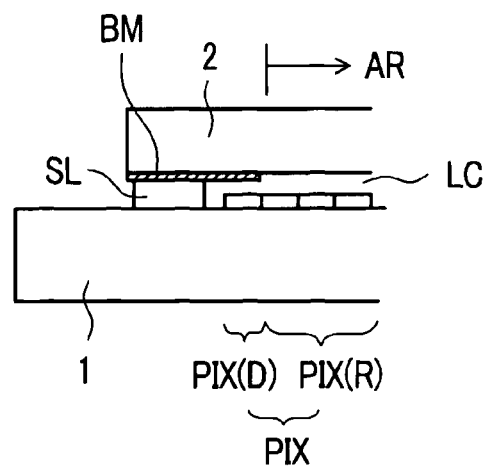
FIG. 3A  FIG. 3B
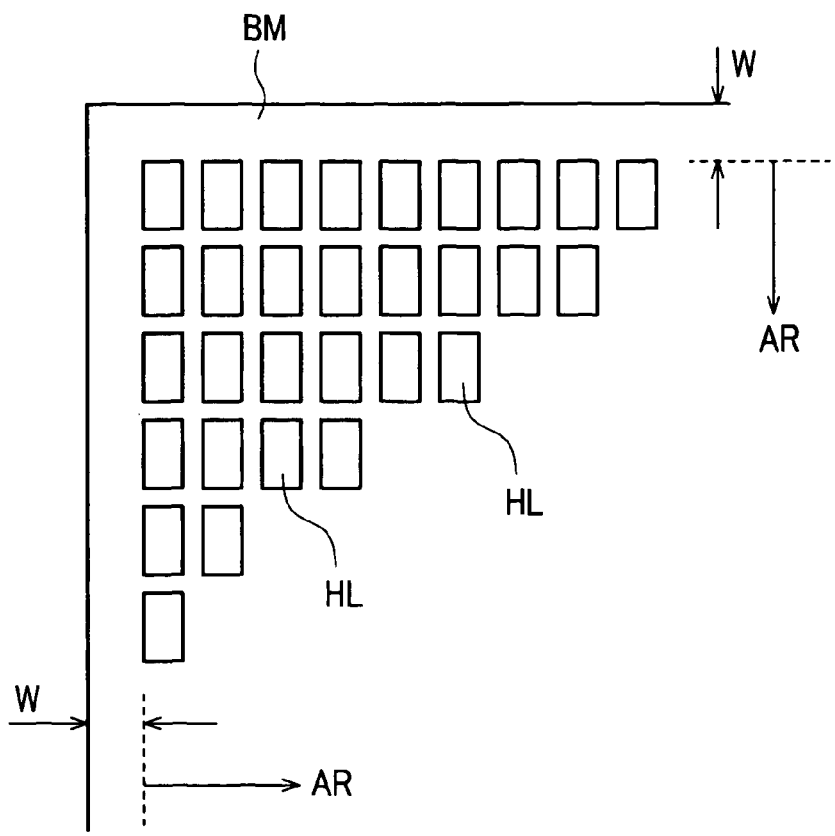
FIG. 4

LIQUID CRYSTAL DISPLAY DEVICE

The present application claims priority from Japanese application JP2006-192274 filed on Jul. 13, 2006, the content of which is hereby incorporated by reference into this application.

BACKGROUND OF THE INVENTION

The present invention relates to a liquid crystal display device, and more particularly to a liquid crystal display device which includes non-display pixels which are called dummy pixels in general.

In a liquid crystal display device, a large number of pixels are formed on liquid-crystal-side surfaces of respective substrates which are arranged to face each other in an opposed manner with liquid crystal sandwiched therebetween, and a liquid crystal display part (liquid crystal display region) is formed by a mass of these pixels.

Each pixel is, for example, constituted of a switching element (thin film transistor) which is formed in a region surrounded by gate signal lines which extend in the x direction and are arranged in parallel in the y direction and drain signal lines which extend in the y direction and are arranged in parallel in the x direction and is turned on in response to a gate signal from the gate signal line, a pixel electrode to which a video signal line is supplied from the drain signal line via the turned-on switching element, and a reference electrode which generates an electric field between the reference electrode and the pixel electrode.

In performing the display driving in a liquid crystal display part having such pixels, pixel rows which are formed along the respective gate signal lines are sequentially selected by sequentially supplying (scanning) gate signals to the respective gate signal lines, and video signals are supplied to the respective pixels of the selected pixel row via each drain signal line in conformity with such timing. In this case, each pixel to which the video signal is supplied is configured to hold a voltage corresponding to the video signal in the pixel electrode due to a capacitive element or parasitic capacitance stored in the pixel until the next signal is supplied.

However, in such a constitution, the difference in a capacitance value, the disturbance of the orientation of the liquid crystal or the like is generated in respective pixels in an uppermost pixel row or a lowermost pixel row and hence, there appears a phenomenon in which the display differs from a display of another pixel.

Here, there has been known a technique which covers the respective pixels in the uppermost pixel row and the lowermost pixel row with a light blocking film thus constituting these respective pixels as dummy pixels which do not contribute to the display.

The detail of the dummy pixels is disclosed in the following
Patent Document 1 or Patent Document 2, for example.
Patent Document 1: JP-A-2005-241778 (corresponding US application; US2005/0184980A1)
Patent Document 2: JP-A-11-52427

SUMMARY OF THE INVENTION

However, the liquid crystal display device having such a constitution is configured such that, for example, as described in Patent Document 1, the dummy pixels are driven in the same manner as other pixels which contribute to the display so as to repeat the transmission and the blocking of light. Accordingly, even when the dummy pixels are covered with the light blocking film, there exists a drawback that leaking of light is generated from an end periphery of the light blocking film.

On the other hand, in Patent Document 2, the dummy pixels are configured to be separated from gate signal lines and drain signal lines thus preventing the transmission and blocking of light.

However, the dummy pixels described in Patent Document 2 has a potential thereof always held in a unstable state and hence, impurities in the inside of liquid crystal in the vicinity of the dummy pixels are liable to be easily attracted to this potential unstable portion thus giving rise to a phenomenon that display irregularities are generated in the vicinity of the dummy pixels.

It is an object of the present invention to provide a liquid crystal display device which can obviate the generation of leaking of light and display irregularities in the vicinity of so-called dummy pixels (non-display pixels).

To simply explain the summary of typical inventions among inventions disclosed in this specification, they are as follows.

A liquid crystal display device of the present invention includes: a pair of substrates which are arranged to face each other in an opposed manner with liquid crystal sandwiched therebetween; a plurality of gate signal lines and a plurality of drain signal lines which are formed on one substrate in a matrix array; a plurality of pixel regions defined by the gate signal lines and the drain signal lines; and a reference electrode and a pixel electrode which are formed in the inside of each pixel region, wherein the plurality of pixel regions are formed in both a display region and a non-display region, and a voltage applied to the reference electrodes is applied to the pixel electrodes in the inside of the pixel regions in the non-display region.

That is, the liquid crystal display device of the present invention is configured such that, in the dummy pixel, by applying the same voltage to the pixel electrode and the reference electrode, driving of liquid crystal of the dummy pixel is not performed.

Here, the present invention is not limited to the above-mentioned constitution and various modifications are conceivable without departing from a technical concept of the present invention.

The liquid crystal display device having such a constitution can obviate the generation of leaking of light and display irregularities in the vicinity of the so-called dummy pixels (non-display pixels).

BRIEF DESCRIPTION OF THE SEVERAL VIEWS OF THE DRAWING

FIG. 3A is a view showing one embodiment of the liquid crystal display device according to the present invention, and FIG. 3B is a view showing the constitution around the black matrix;

FIG. 4 is a plan view of the black matrix which is used in one embodiment of the liquid crystal display device according to the present invention;

DESCRIPTION OF THE PREFERRED EMBODIMENT

Hereinafter, embodiments of the liquid crystal display device according to the present invention are explained in conjunction with the drawings.

Figure 2A:
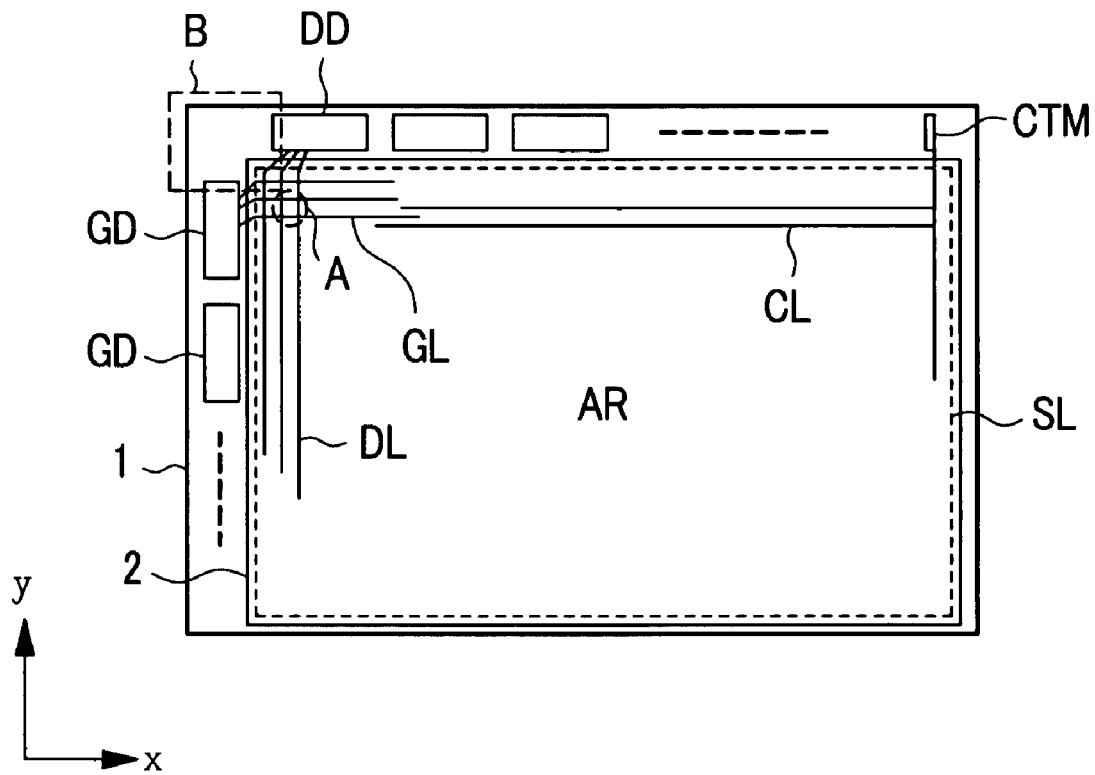
FIG. 2 is a schematic constitutional view showing one embodiment of the liquid crystal display device according to the present invention.
Figure 2B:
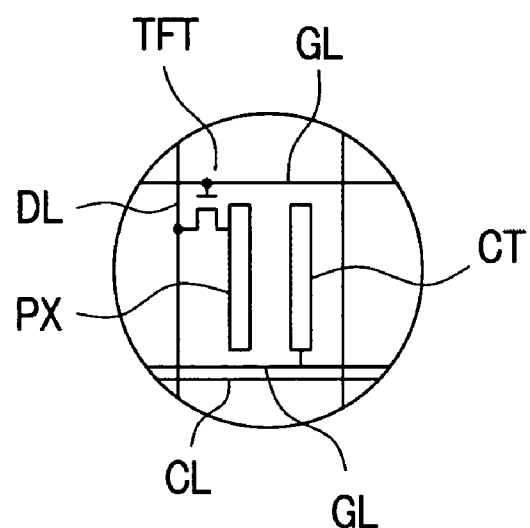

FIG. 2 is a schematic constitutional view showing one embodiment of the liquid crystal display device according to the present invention.

In FIG. 2, substrates 1, 2 are arranged to face each other in an opposed manner with liquid crystal sandwiched therebetween. For example, both the respective substrates 1, 2 are constituted of a transparent substrate made of glass or the like. The substrate 2 is formed with an area slightly smaller than an area of the substrate 1, and has a region where the substrate 1 is exposed from the substrate 2, for example, on a left side and an upper side of the substrate 1 in the drawing. Gate signal driving circuits GD each constituted of a semiconductor chip are mounted on the region arranged on the left side of the substrate 1 in the drawing and drain signal driving circuits DD each constituted of a semiconductor chip are mounted on the region arranged on an upper side of the substrate 1 in the drawing.

The substrate 2 is fixed to the substrate 1 using a sealing agent SL which is formed on the whole area of a periphery of the substrate 2, and the sealing agent SL has a function as a sealing agent which seals liquid crystal interposed between the respective substrates 1, 2.

A region which is surrounded by the sealing agent SL and forms a region in which openings of a black matrix (light blocking film) BM are formed is constituted as a liquid crystal display region AR.

The liquid crystal display region AR is constituted of a mass of a large number of pixels which are arranged in a matrix array. The constitution of each pixel is, in FIG. 2, shown by an equivalent circuit in an enlarged view A' of a dotted circular frame A in the inside of the liquid crystal display region AR.

That is, as shown in the enlarged view A', gate signal lines GL and common signal lines CL which, in the drawing, extend in the x direction and are arranged in parallel in the y direction are formed, and drain signal lines DL which, in the drawing, extend in the y direction and are arranged in parallel in the x direction are formed.

Further, the gate signal lines GL and the common signal lines CL are alternately arranged, for example, from an upper side of the drawing to a lower side, in order of the gate signal line GL, the common signal line CL which is spaced apart from the gate signal line GL with a relatively large distance therebetween, the gate signal line GL which is spaced apart from the common signal line CL with a relatively small distance therebetween, the common signal line CL which is spaced apart from the gate signal line GL with a relatively large distance, . . . .

A region which is surrounded by the gate signal line GL, the common signal line CL which is spaced apart from the gate signal line GL with the relatively large distance, and a pair of drain signal lines DL is constituted as a pixel region.

The pixel region includes a thin film transistor TFT which is turned on in response to a gate signal from the gate signal line GL, a pixel electrode PX to which a video signal from the drain signal line DL is supplied via the thin film transistor TFT which is turned on, and a reference electrode CT (It is also called a common electrode CT.) which generates an electric field between the reference electrode CT and the pixel electrode PX and is connected to the common signal line CL.

Between the pixel electrode PX and the reference electrode CT, for example, the electric field which is substantially parallel to surfaces of the substrates 1, 2 is generated, and the behavior of molecules of the liquid crystal is generated due to the electric field.

Here, the respective gate signal lines GL get over a forming region of the sealing agent SL on the left side of the drawing, for example, and are connected to output bumps of the gate signal driving circuits GD. Further, the respective common signal lines CL get over the forming region of the sealing agent SL on the right side of the drawing, for example, and are connected to a common signal terminal CTM. Further, the respective drain signal lines DL get over the forming region of the sealing agent SL on the upper side of the drawing, for example, and are connected to output bumps of the drain signal driving circuits DD.

The gate signal driving circuits GD select a pixel row, for example, by sequentially supplying (scanning) gate signals to the respective gate signal lines GL, and the drain signal driving circuits DD supply video signals to the respective pixels of the selected pixel row via the respective drain signal lines DL.

FIG. 3 is a view showing an upper left portion of the liquid crystal display region AR of the liquid crystal display device, that is, a portion of a dotted line rectangular frame B shown in FIG. 2 in an enlarged manner. However, the gate signal driving circuits GD, the gate signal lines GL, the drain signal driving circuits DD, the drain signal lines DL and the like are omitted from the drawing.

In FIG. 3A, the substrate 2 has a periphery thereof fixed to the substrate 1 by way of the sealing agent SL.

Here, the black matrix BM is formed on a liquid-crystal-side surface of the substrate 2. To be more accurate, the black matrix BM is, as shown in FIG. 4, formed in a pattern in which openings HL are formed in the liquid crystal display region AR at portions which face center portions of the respective pixels excluding peripheries of the respective pixels. However, in FIG. 3A, for the sake of brevity, only a peripheral portion of the black matrix BM having a width W where the openings HL are not formed (also referred to as a peripheral portion of black matrix BM) is shown.

Further, FIG. 3B shows a cross-section taken along a line b-b in FIG. 3A. In FIG. 3B, respective pixels PIX are formed on a liquid-crystal-LC-side surface of the substrate 1 which faces the substrate 2 in an opposed manner, and these pixels PIX are constituted of pixels PIX(R) which contribute to an actual display and so-called dummy pixels PIX(D).

The dummy pixels PIX(D) are formed, in this embodiment, as a group of pixels of one row, for example, which is formed on an upper stage of the respective pixels PIX(R) which are arranged in a matrix array and contributes to the display in parallel to the gate signal line GL, and a group of pixels of one row, for example, which is formed on a lower stage of the respective pixels PIX(R) in parallel to the gate signal line GL.

These dummy pixels PIX(D) are positioned and arranged below a peripheral portion of the black matrix BM, and the openings HL are not formed in the peripheral portion of the black matrix BM and hence, a viewer of the liquid crystal display device cannot observe the dummy pixels PIX(D) with naked eyes.

Although the constitution of the dummy pixels PIX(D) is explained in detail later, because of necessity to give the same conditions to the dummy pixels PIX(D) with respect to a capacitance (including parasitic capacitance) and a shape of surface undulation which influences the orientation of the liquid crystal which the pixels PIX (R) which contribute to the display possess, it is desirable that the dummy pixels PIX(D) have the substantially equal constitution as the pixels PIX(R).

Figure 5:
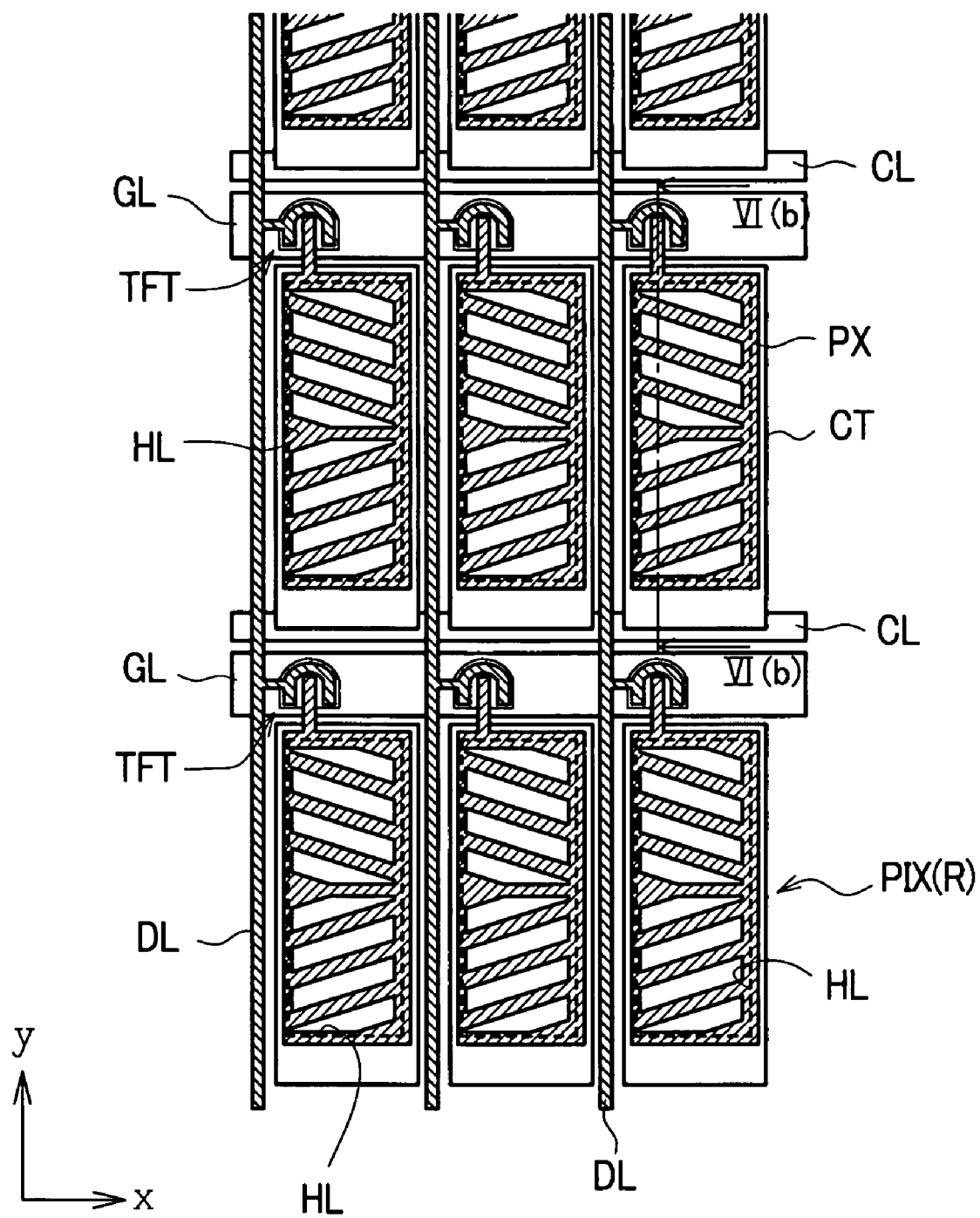
FIG. 5 is a view showing one embodiment of the liquid crystal display device according to the present invention, and also is a plan view showing respective pixels which are arranged in an liquid crystal display region.
Figure 6A:
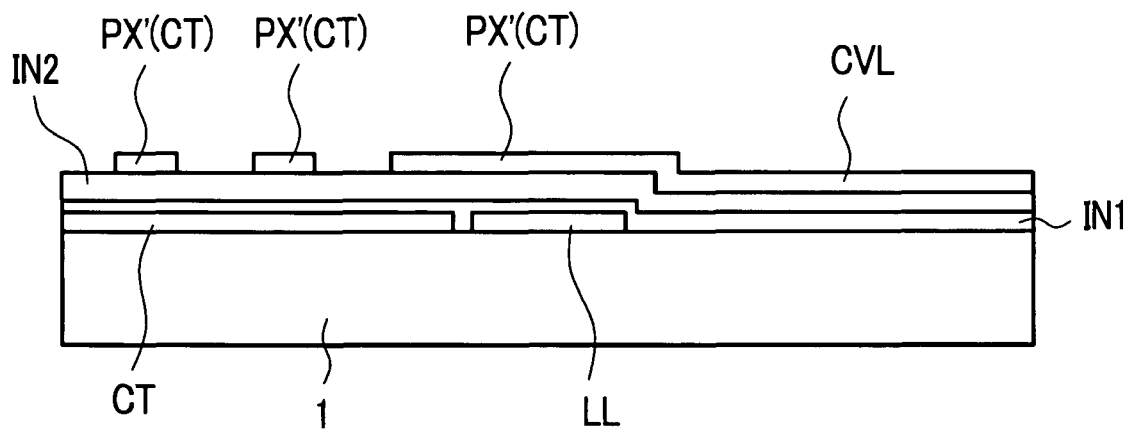
FIG. 6A is a cross-sectional view taken along a line VI(a)-VI(a) in FIG. 1.
Figure 6B:
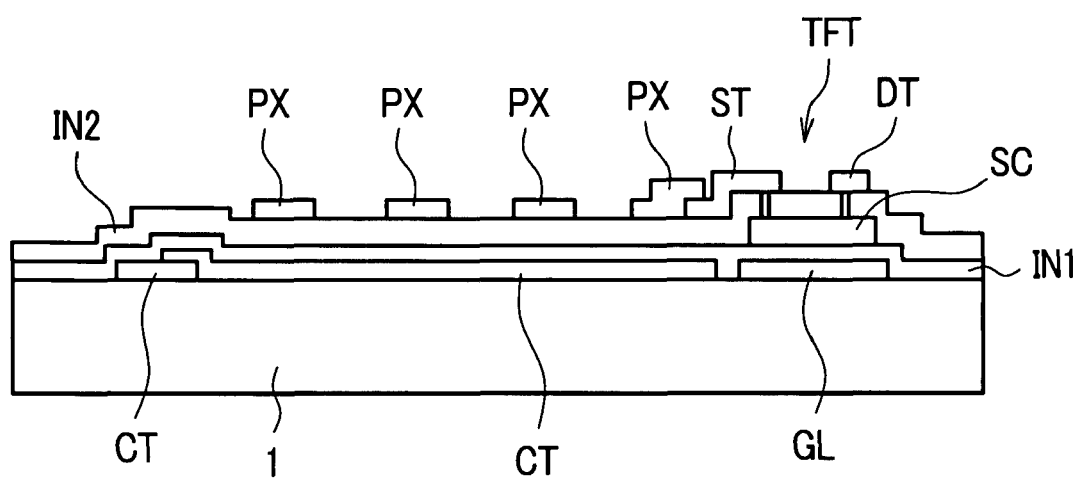
FIG. 6B is a cross-sectional view taken along a line VI(b)-VI(b) in FIG. 5.

FIG. 5 is a plan view showing one embodiment of the pixels PIX(R) which contribute to the display, wherein FIG. 5 shows (2×3) pieces of pixels PIX(R), for example. Further, FIG. 6B is a cross-sectional view taken along a line VI(b)-VI(b) in FIG. 5.

First of all, on the liquid crystal-surface side of the substrate 1, the gate signal lines GL and the common signal lines CL are formed. For example, the gate signal line GL is formed on an upper side in the drawing with respect to the pixel region, and the common signal line CL is formed on a lower side with respect to the pixel region. Due to the gate signal line GL, the common signal line CL and the drain signal line DL described later, the pixel region is defined from another neighboring pixel region.

The reference electrode CT is formed in the pixel region between the gate signal line GL and the common signal line CL, and the reference electrode CT is electrically connected with the common signal line CL in a state that the reference electrode CT directly overlaps the common signal line CL.

The reference electrode CT is formed of a planar electrode which is formed on a center portion of the pixel region excluding slight peripheral portions and, at the same time, is constituted as a transparent electrode formed of an ITO (Indium Tin Oxide) film, for example.

On the surface of the substrate 1 on which the gate signal lines GL, the common signal lines CL and the reference electrodes CT are formed in this manner, a first insulation film IN1 is formed in a state that the first insulation film IN1 also covers these gate signal lines GL, common signal lines CL and reference electrodes CT. The first insulation film IN1 is, for example, formed of a silicon nitride film, and functions as a gate insulation film in a region where a thin film transistor TFT described later is formed.

Then, on an upper surface of the first insulation film IN1, semiconductor layers SC are formed in a state that the semiconductor layer SC overlaps a portion of the gate signal line GL. Further, on a surface of the semiconductor layer SC, the drain electrode DT and a source electrode ST are formed in a spaced-apart manner from each other thus forming an MIS-type transistor (thin film transistor TFT) having the inverse staggered structure which uses the portion of the gate signal line GL as the gate electrode.

Here, for example, the drain electrode DT is integrally formed with the drain signal line DL and, at the same time, the source electrode ST is formed simultaneously with the drain electrode DT. The source electrode ST extends to the outside of the region where the semiconductor SC is formed, and the source electrode ST is connected with the pixel electrode PX described later at an extended portion thereof.

Here, in the thin film transistor TFT, the drain electrode DT and the source electrode ST have properties which are exchanged depending on the manner of applying a bias. In this specification, a side which is connected to the drain signal line DL is referred to as the drain electrode DT and a side which is connected to the pixel electrode PX is referred to as the source electrode ST.

Here, the drain electrodes DT, drain signal lines DL and the source electrodes ST are formed on an upper surface of a second insulation film IN2 which is formed on the surface of the substrate 1 in a state that the second insulation film IN2 also covers the semiconductor layer SC, and the drain electrode DT and the source electrode ST are electrically connected with the semiconductor layer SC via through holes formed in the second insulation film IN2. Here, the second insulation film IN2 functions as a protective film which prevents a direct contact of liquid crystal with the thin film transistor TFT.

Further, on an upper surface of the second insulation film IN2, the pixel electrodes PX are formed in a state that the pixel electrodes PX overlap the reference electrodes CT. The pixel electrodes PX are formed in a pattern in which strip-like electrodes extend in one direction and are arranged in parallel in the direction which intersects one direction, and respective electrodes have both ends thereof connected with each other, for example. The pixel electrodes PX are constituted of a transparent electrode formed of an ITO (Indium Tin Oxide) film, for example.

When the voltage difference is generated between the reference electrode CT and the pixel electrodes PX, an electric field corresponding to the voltage difference is generated substantially parallel to the surface of the substrate 2, and the behavior of the molecules of the liquid crystal is generated by the electric field.

Here, although not shown in the drawing, an orientation film is formed on the surface of the substrate 1 on which the pixel electrodes PX are formed. The orientation film is directly brought into contact with liquid crystal thus determining the initial orientation direction of the liquid crystal.

Further, the black matrix BM which is formed on the liquid-crystal-surface side of the substrate 2 which faces the respective pixels shown in FIG. 5 in an opposed manner covers the gate signal lines GL, the drain signal line DL, the thin film transistor TFT and the like, and forms openings which expose the center portions of the pixels. The openings are indicated by symbols HL in FIG. 5.

Figure 1:
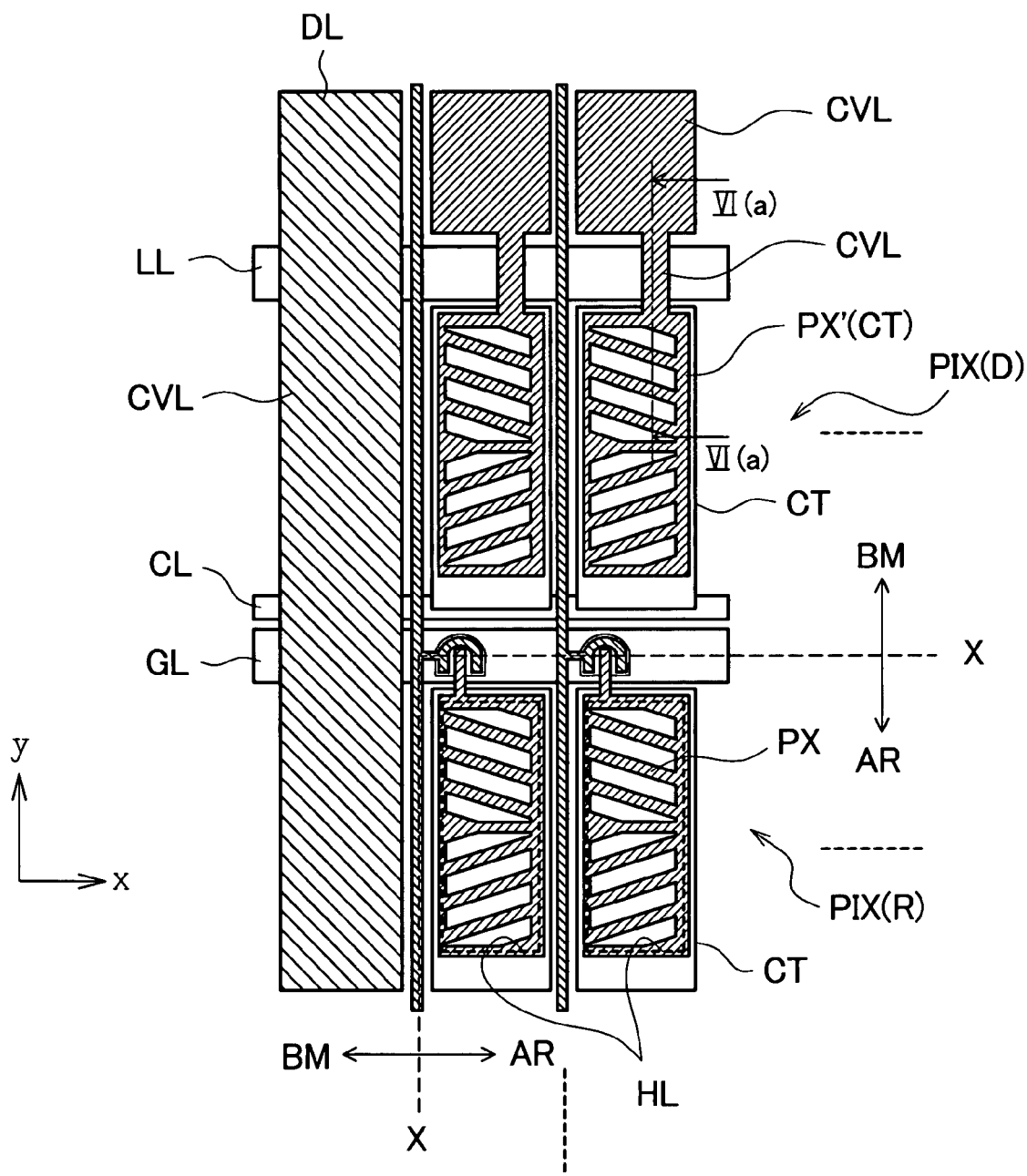
FIG. 1 is a view showing one embodiment of a liquid crystal display device according to the present invention, and also is a plan view showing respective pixels which are arranged in the vicinity of a peripheral portion of a black matrix.

FIG. 1 is a plan view showing one embodiment of pixels PIX(D) which are referred to as dummy pixels. In FIG. 1, the dummy pixels PIX(D) are depicted together with the above-mentioned pixel PIX(R) in a state that the dummy pixels PIX(D) are arranged close to the dummy pixels PIX(R).

That is, in FIG. 1, a dotted line portion X-X which defines a liquid crystal display region AR and a peripheral portion of the black matrix BM is shown. Using this dotted line portion X-X as a boundary, the pixels PIX(D) which are referred to as the dummy pixel are formed on a peripheral-portion side of the black matrix BM, while the pixels PIX(R) which contribute to a display is formed on a liquid-crystal-display-region-AR side. FIG. 6A is a cross-sectional view taken along a line VI (a)-VI (a) in FIG. 1.

The pixel PIX(D) is formed in a region which is surrounded by the line layer LL, the common signal line CL and the drain signal lines DL formed on an upper surface of the substrate 1 as described later.

The line layers LL correspond to the gate signal lines GL of the pixels PIX (R) which contribute to the display, wherein the line layers LL are formed in the substantially same pattern as the gate signal lines GL at portions corresponding to the gate signal lines GL. The reason that the line layers LL are not referred to as the gate signal lines GL is that the line layers LL are configured such that the reference voltage is applied to the line layers LL instead of a gate signal.

Further, in the same manner as the common signal lines CL of the pixels PIX(R) which contribute to the display, the reference voltage is applied to the common signal lines CL.

Over a surface of the substrate 1 on which the line layers LL and the common signal lines CL are formed, a first insulation film IN1 is formed in a state that the first insulation film IN1 also covers the line layers LL and the common signal lines CL. The first insulation film IN1 is formed by extending the first insulation film IN1 formed on the pixels PIX(R) which contribute to the display extends to a region of the pixels PIX(D).

Here, the pixel PIX(D) is configured such that the thin film transistor TFT formed in the pixel PIX (R) which contributes to the display is not formed in the pixel PIX(D). This is because that, as described later, the pixel PIX(D) is configured not to drive the liquid crystal and hence, the pixel PIX(D) is not required to form the thin film transistor TFT therein.

Further, in this embodiment, a position in the pixel PIX(D) which corresponds to a portion where the thin film transistor TFT of the pixel PIX(R) which contributes to the display is formed is spaced apart from the liquid crystal display region AR with a large distance therebetween. Accordingly, it is considered that the disturbance of orientation on the surface of the pixel due to the non-formation of the thin film transistor TFT in the pixel PIX(D) does not influence the liquid crystal display region AR.

A second insulation film IN2 is formed on the upper surface of the first insulation film IN1. The second insulation film IN2 is formed by extending the second insulation film IN2 formed on the pixels PIX(R) which contribute to the display to the region of the pixels PIX(D).

Further, on the second insulation film IN2, electrodes PX' are formed in a state that the electrodes PX' overlap the reference electrode CT. The electrodes PX' are formed on the same layer as the pixel electrodes PX at the pixels PIX(R) which contribute to the display in the same pattern as the pixel electrodes PX. Different from the pixel electrodes PX, the video signal is not supplied to this electrodes PX', and the reference voltage is applied to the electrodes PX'.

That is, the electrodes PX' are integrally formed with a reference voltage supply signal line CVL which is formed such that the reference voltage supply signal line CVL strides over the line layer LL and is pulled out in the direction away from the liquid crystal display region AR. The reference voltage is supplied to the electrodes PX' by way of the reference voltage supply signal line CVL.

Due to such a constitution, the reference voltage is applied to the electrode PX' and the reference electrode CT which are arranged in the pixel PIX(D) respectively and hence, the behavior of the liquid crystal is not generated thus eliminating a possibility of the repetition of transmission of light and the blocking of light.

Accordingly, there is no possibility that leaking of light is generated from end peripheries of the black matrix BM. Further, the pixel PIX(D) has a potential thereof always held in a stable state and hence, it is possible to obviate a phenomenon that impurities in the inside of the liquid crystal in the vicinity of the pixel PIX(D) is attracted whereby the generation of display irregularities can be prevented.

Further, out of the periphery outside the liquid crystal display region AR, at a portion which is arranged parallel to the drain signal line DL, the reference voltage supply signal line CVL is formed parallel to the drain signal line DL.

The reference voltage supply signal line CVL is formed with a large line width along with the reference voltage supply signal line CVL which is directly pulled out from the electrode PX' of the pixel PIX(D). With the use of these reference voltage supply signal lines CVL, a relatively large region which surrounds the whole periphery outside the liquid crystal display region AR and the region where the pixels PIX(D) referred to as dummy electrodes are formed. Due to such a constitution, the infiltration of noises can be avoided thus allowing the respective pixels PIX(R) in the liquid crystal display region AR to perform the stable operation.

Here, FIG. 1 shows the constitution of the pixels PIX(D) for dummy display which are arranged on an uppermost stage side of the liquid crystal display region AR. However, the pixels PIX(D) for dummy display which are also arranged on a lowermost stage side of the liquid crystal display region AR, and pixel PIX(D) for dummy display also has a constitution substantially equal to the constitution shown in FIG. 1.

The above-mentioned liquid crystal display device is configured such that in each pixel PIX(R) which contributes to the display, the electric field parallel to the substrate 1 is generated between the reference electrode CT and the pixel electrode PX and the behavior of the liquid crystal molecules is generated by the electric field.

Compared to a liquid crystal display device which is configured to arrange electrodes on respective opposedly-facing surfaces of the respective substrates arranged with liquid crystal sandwiched therebetween and an electric field is generated between these electrodes, this liquid crystal display device uses a relatively weak electric field. Due to such a relatively weak electric field, the pixel electrode PX is arranged at a position extremely close to the reference electrode CT.

This implies that even when the dummy pixels are arranged close to the pixels which contribute to the display, and in the dummy pixels, a voltage having the same potential as the voltage applied to the reference electrode CT is supplied to the respective electrodes corresponding to the reference electrode CT and the pixel electrodes PX, there is no possibility that the electric field generated in the pixels which contribute to the display is attracted to the dummy pixel side.

Accordingly, even when the dummy pixels have the above-mentioned constitution, there is no possibility that the distribution of the electric field is disturbed in the pixels which contribute to the display and are arranged close to the dummy pixels.

Further, in the above-mentioned embodiment, dummy pixels are formed such that one row of the dummy pixels is formed on the upper stage of the liquid crystal display region and one row of dummy pixels is formed on the lower stage of the liquid crystal display region. However, it is needless to say that the present invention is not limited to such embodiments, and a plurality of rows of dummy pixels may be formed on the upper and lower stages of the liquid crystal display region respectively.

The above-mentioned respective embodiments are used in a single form or in combination. This is because that the advantageous effects can be obtained singularly or synergistically.

What is claimed is:

1. A liquid crystal display device, comprising:
    a pair of substrates which are arranged to face each other in an opposed manner with liquid crystal sandwiched therebetween;
    a plurality of gate signal lines and a plurality of drain signal lines which are formed on one substrate in a matrix array;
    a plurality of pixel regions defined by the gate signal lines and the drain signal lines; and
    a reference electrode and a pixel electrode which are formed in the inside of each pixel region, wherein:

the plurality of pixel regions are formed in both a display region and a non-display region, a voltage applied to the reference electrodes is applied to the pixel electrodes in the inside of the pixel regions in the non-display region, the pixel electrodes in the pixel regions in the inside of the non-display region do not include thin film transistors, reference voltage supply signal lines for applying the reference voltage to the pixel electrode in the pixel regions in the inside of the non-display region connect directly to the pixel electrodes, the reference voltage supply signal lines are formed in parallel to the drain signal lines, and a line width of the reference voltage supply signal lines is larger than a line width of the drain lines.

2. A liquid crystal display device according to claim 1, wherein non-display region lines which are arranged in parallel with the gate signal lines are formed in the inside of the non-display region at positions where the non-display region lines do not overlap the reference electrodes, and a voltage applied to the reference electrodes is applied to the non-display region lines.

3. A liquid crystal display device according to claim 1, wherein the non-display region lines are formed on the same layer as the gate signal lines.

4. A liquid crystal display device according to claim 1, wherein common signal lines to each of which the reference electrodes in the respective pixel regions which are arranged in the row direction are connected in common are formed in the pixel regions of the display region and the non-display region, and the common signal lines in the display region and the non-display region are formed on the same layer in the same pattern.

5. A liquid crystal display device according to claim 1, wherein the reference electrode has a rectangular shape.

6. A liquid crystal display device according to claim 5, wherein the line width of the reference voltage supply signal lines is substantially equal to a width of the reference electrodes.

7. A liquid crystal display device according to claim 1, wherein light-blocking films are formed at positions which overlap the pixel regions of the non-display region.

* * * * *